US010886965B2

(12) United States Patent
Knopp et al.

(10) Patent No.: US 10,886,965 B2
(45) Date of Patent: Jan. 5, 2021

(54) ORTHOGONAL CORRELATION SIGNALS FOR DETECTION AND SYNCHRONIZATION AT LOW SNR

(71) Applicant: Universität der Bundeswehr München, Neubiberg (DE)

(72) Inventors: Andreas Knopp, Bad Elster (DE); Christian Hofmann, Munich (DE); Robert Schwarz, Haar (DE)

(73) Assignee: Universität der Bundeswehr München, Neubiberg (DE)

( * ) Notice: Subject to any disclaimer, the term of this patent is extended or adjusted under 35 U.S.C. 154(b) by 0 days.

(21) Appl. No.: 16/488,181

(22) PCT Filed: Feb. 20, 2018

(86) PCT No.: PCT/EP2018/054098
§ 371 (c)(1),
(2) Date: Aug. 22, 2019

(87) PCT Pub. No.: WO2018/153836
PCT Pub. Date: Aug. 30, 2018

(65) Prior Publication Data
US 2020/0067564 A1 Feb. 27, 2020

(30) Foreign Application Priority Data
Feb. 24, 2017 (EP) .................................. 17157923

(51) Int. Cl.
*H04B 1/707* (2011.01)
*G01S 5/02* (2010.01)
(Continued)

(52) U.S. Cl.
CPC ............ *H04B 1/707* (2013.01); *G01S 5/0221* (2013.01); *H04B 1/69* (2013.01); *G01S 11/08* (2013.01); *H04B 2001/6912* (2013.01)

(58) Field of Classification Search
CPC .......... H04B 1/707; H04B 1/69; G01S 5/0221
See application file for complete search history.

(56) References Cited

U.S. PATENT DOCUMENTS 4,037,159 A   7/1977  Martin
6,850,553 B1  2/2005  Waschka et al.
(Continued)

FOREIGN PATENT DOCUMENTS

EP    2296128 B1    10/2009
EP   2 996 264 A1    3/2016
(Continued)

OTHER PUBLICATIONS

Boumard S et al: "Robust and Accurate Frequency and Timing Synchronization Using Chirp Signals", IEEE Transactions on Broadcasting, IEEE Service Center, Piscataway, NJ, US, vol. 55, No. 1, Mar. 1, 2009 (Mar. 1, 2009), pp. 115-123.

(Continued)

*Primary Examiner* — Jaison Joseph
(74) *Attorney, Agent, or Firm* — Steven J. Grossman; Grossman Tucker Perreault & Pfleger, PLLC

(57) ABSTRACT

Provided is a layered process for identifying a first signal sequence within a received signal sequence by cross-correlating a received signal sequence with a first correlation sequence to derive a first correlation pattern indicating occurrences of the first correlation sequence within the received signal sequence and cross-correlating the first correlation pattern with a first correlation sequence pattern to detect a first signal sequence comprising occurrences of the first correlation sequence as indicated by the first correlation sequence pattern, within the received signal sequence.

13 Claims, 7 Drawing Sheets

(51) Int. Cl.
*H04B 1/69* (2011.01)
*G01S 11/08* (2006.01)

(56) References Cited

U.S. PATENT DOCUMENTS

| | | | | |
|---|---|---|---|---|
| 8,477,828 | B2* | 7/2013 | Schmid | H03J 7/04 |
| | | | | 370/319 |
| 8,547,950 | B2* | 10/2013 | Hjelm | G01S 19/06 |
| | | | | 370/328 |
| 2001/0038670 | A1 | 11/2001 | Whight | |
| 2006/0133463 | A1* | 6/2006 | Pietila | G01S 19/30 |
| | | | | 375/150 |
| 2014/0064337 | A1* | 3/2014 | Hiscock | H04B 1/69 |
| | | | | 375/139 |
| 2015/0288416 | A1* | 10/2015 | Goldberg | G01S 19/11 |
| | | | | 375/149 |
| 2016/0116599 | A1* | 4/2016 | Turner | G01S 19/29 |
| | | | | 342/357.68 |
| 2017/0264406 | A1* | 9/2017 | Lei | H04W 72/0406 |
| 2018/0329072 | A1* | 11/2018 | Anderson | G01S 19/22 |

FOREIGN PATENT DOCUMENTS

| | | |
|---|---|---|
| EP | 2996264 A1 | 3/2016 |
| WO | 200145278 A2 | 6/2001 |

OTHER PUBLICATIONS

A. Gesell; J. Huber; B. Lankl; G. Sebald: "Data-aided Timing Recovery for PAM Burst-mode Transmission", Proceedings IEEE ICT, vol. 2, Jun. 2001 (Jun. 2001), pp. 431-436.

S. Maric; Z. Kostic; E. Titlebaum: "A new family of optical code sequences for use in spread-spectrum fiber-optic local area networks", IEEE Transactions on Communications, vol. 41, No. 8, 1993.

International Search Report and Written Opinion regarding corresponding International application No. PCT/EP2018/054098, dated May 15, 2018.

Musicki, Darko, et al., "Geolocation using TDOA and FDOA Measurements", Entropy Data Pty Ltd, pp. 1987-1994.

Ho, K.C., et al., "Geolocation of a Known Altitude Object From TDOA and FDOA Measurements," IEEE Transactions on Aerospace and Electronic Systems vol. 33, pp. 770-783, No. 3 Jul. 1997.

Chung, Fan, et al., "Optical Orthogonal Codes: Design, Analysis, and Applications", IEEE Transactions on Information Theory, vol. 35, No. 3, pp. 595-605, May 1989.

Chu, David C., "Polyphase Codes With Good Periodic Correlation Properties", Hewlett-Packard Company, Santa Clara, CA, IEEE Transactions on Information Theory, Jul. 1972, pp. 531-532.

* cited by examiner

44 — CROSS-CORRELATING A RECEIVED SIGNAL SEQUENCE WITH A FIRST CORRELATION SEQUENCE TO DERIVE A FIRST CORRELATION PATTERN INDICATING OCCURRENCES OF THE FIST CORRELATION SEQUENCE WITHIN THE RECEIVED SIGNAL SEQUENCE

46 — CROSS-CORRELATING THE FIRST CORRELATION PATTERN WITH A FIRST CORRELATION SEQUENCE PATTERN TO DETECT A FIRST SIGNAL SEQUENCE COMPRISING OCCURRENCES OF THE FIRST CORRELATION SEQUENCE AS INDICATED BY THE FIRST CORRELATION SEQUENCE PATTERN, WITHIN THE RECEIVED SIGNAL SEQUENCE

Fig. 7

ORTHOGONAL CORRELATION SIGNALS FOR DETECTION AND SYNCHRONIZATION AT LOW SNR

The present invention relates to code division multiple access, CDMA. In particular, the present invention relates to a layered process for identifying signal sequences comprising unique chirp spread spectrum sequence patterns within a received signal sequence.

BACKGROUND

Accurate localization is desired for many military, commercial and research applications. For example, global navigation satellite systems (GNSS) enable a receiver to determine its location based on the propagation delay between signals received from different senders. Alternatively, localization may be performed by transmitting a signal sequence form a sender to multiple terrestrial, air-borne or space-based signal analyzers to allow for estimating the sender location based on the propagation delay.

Preferably, the signal sequence should provide for high correlation gain to be detectable at very low signal to noise ratios (SNR). Moreover, energy consumption during transmission of the signal sequence should be low to allow for long term operation of mobile senders. Furthermore, hardware requirements should be low to enable the provision of senders at low cost. For example, the localization of small animals like birds in areas without communication infrastructure could benefit from the provision of low-cost, low-weight, active tags that allow for continuous wide-area localization over long periods of time.

SUMMARY

The present invention accomplishes the foregoing and related ends by providing a method, a sender, a signal analyzer and a system, wherein the system comprises the signal analyzer and a plurality of senders.

The method comprises cross-correlating a received signal sequence with a first correlation sequence to derive a first correlation pattern indicating occurrences of the first correlation sequence within the received signal sequence and cross-correlating the first correlation pattern with a first correlation sequence pattern to detect a first signal sequence comprising occurrences of the first correlation sequence as indicated by the first correlation sequence pattern, within the received signal sequence.

In this regard, the term "signal sequence" as used in the description and the claims, particularly refers to time series signal samples. Moreover, the term "correlation sequence" as used in the description and the claims, particularly refers to time series signal samples exhibiting low auto-correlation. Furthermore, the term "cross-correlating" as used in the description and the claims, particularly refers to determining a measure of similarity of two sequences as a function of the displacement of one relative to the other. Further, the term "correlation pattern" as used in the description and the claims, particularly refers to a similarity map of the first correlation sequence and the received signal sequence, e.g., a measure of similarity of the first correlation sequence and the received signal sequence as a function of the displacement of one relative to the other, the similarity map indicating which parts of the received signal sequence show high similarity to/resemble the first correlation sequence.

In addition, the term "correlation sequence pattern" as used in the description and the claims, particularly refers to known or expected occurrences of the correlation sequence within the first signal sequence, wherein distances and/or center frequencies between consecutive correlation sequence occurrences may vary to allow for a unique correlation sequence pattern. For example, the received signal sequence may comprise a plurality of different correlation sequence patterns having low cross-correlation and thus being detectable within the received signal sequence based on cross-correlating the first correlation pattern with the respective correlation sequence pattern.

As a further aspect, this allows effectively re-using the first correlation pattern in detecting different signal sequences, wherein the different signal sequences may originate from the same sender (to allow for data transmission) and/or different senders.

For example, each sender may be enabled to transmit different unique correlation sequence patterns to convey data, e.g., different code words. For instance, each sender may be associated with a number of unique correlation sequence patterns. Upon detection of a respective correlation sequence pattern, a sender and a code word can be associated thereto. In particular, each sender may be enabled to transmit the same code words (e.g., code words related to its state or to the state of the bearer of the sender) using, however, different unique correlation sequence patterns which allows the senders to transmit data in an unsynchronized, random fashion.

Alternatively, or in addition, the correlation sequences within a correlation sequence pattern may be further manipulated in amplitude and/or phase to transmit data.

Hence, the present method provides a layered process for detecting unique signal sequences in the received signal. In a first step, the method detects all occurrences of a first correlation sequence in the received signal. In a second step, a pattern is matched to the occurrences. Thus, even at low SNR where the occurrences of the first correlation sequence become hardly detectable, a pattern having a large number of occurrences of the first correlation sequence (e.g., more than 10, 20, 30, 40, 50, 60, 70, 80, 90, or 100 occurrences) and a small cross-correlation with other correlation sequence patterns in the received signal might be detectable. Based on the pattern, a sender of the unique signal sequence may be identified. Moreover, analyzing the derived pattern, a frequency offset of the sender's clock may be determined and a timing of the sender may be calculated to enable synchronization between the sender and the signal analyzer.

Preferably, the first correlation sequence is a constant amplitude zero autocorrelation, CAZAC, sequence.

By using CAZAC sequences, a high correlation gain can be achieved.

Preferably, the method further comprises cross-correlating the received signal sequence with a second correlation sequence to derive a second correlation pattern indicating occurrences of the second correlation sequence within the received signal sequence, wherein the second correlation sequence is a complex conjugate of the CAZAC sequence, cross-correlating the second correlation pattern with a second correlation sequence pattern to detect occurrences of the second correlation sequence as indicated by the second correlation sequence pattern within the received signal sequence, and determining a measure of a frequency shift of the first signal sequence based on a distance between occurrences of the first correlation sequence and the second correlation sequence within the received signal sequence.

For example, a coarse estimation of the carrier frequency offset may be based on determining a shift (in samples) between the maximum/peak of the cross-correlation between the first correlation pattern with the first correlation sequence pattern and the maximum/peak of the cross-correlation between the second correlation pattern with the second correlation sequence pattern, respectively.

Preferably, the method further comprises determining a measure of a frequency shift of the first signal sequence based on a phase difference between occurrences of the first correlation sequence within the received signal sequence.

For example, a frequency offset Δf may be determined from estimating the phase shift between CAZAC sequences within the received signal sequence.

Preferably, the method further comprises estimating a timing of a first sender from which the first signal sequence was received and extracting data from a second signal sequence based on the determined measure.

For example, the first signal sequence may be used as a training signal sequence to enable synchronization for demodulating a second signal sequence from the first sender.

Preferably, the first correlation sequence and the second correlation sequence are chirp sequences.

Thus, detecting the correlation sequences within the received signal sequence can be further facilitated as frequency offsets can be more easily tolerated and the power of the signal may be distributed over a large frequency spectrum.

Preferably, the received signal sequence is a first received signal sequence and the method further comprises cross-correlating a third received signal sequence with the first correlation sequence to derive a third correlation pattern indicating occurrences of the first correlation sequence within the third received signal sequence, cross-correlating the third correlation pattern with the first correlation sequence pattern to detect the first signal sequence comprising occurrences of the first correlation sequence as indicated by the first correlation sequence pattern, within the third received signal sequence, determining a first time of flight of the first signal sequence within the first received signal sequence and a second time of flight of the first signal sequence within the third received signal sequence, and providing position data of a sender of the first signal sequence based on the first and second times of flight.

Hence, a position of a plurality of senders may be determined and tracked. For, example, the difference in the time of flight may be used to determine possible locations of a sender of the signal. Moreover, the location may be more precisely determined by calculating the Doppler-shifts of the first and third received signal sequences.

The sender comprises an antenna, a power storage device, and circuitry for causing the antenna to transmit an identification signal, the identification signal comprising a carrier wave modulated with CAZAC sequences.

For example, a pattern having a large number of CAZAC sequences (e.g., more than 10, 20, 30, 40, 50, 60, 70, 80, 90, or 100 occurrences) with varying distances and/or center frequencies between consecutive CAZAC sequences may achieve a very small cross-correlation with other CAZAC sequence patterns used by the sender or by other senders and thus uniquely identify the sender and/or data conveyed in the identification signal.

Preferably, the circuitry is configured to manipulate the CAZAC sequences in amplitude or phase to convey data.

Hence, the transmitted data can be uniquely assigned to the sender.

The signal analyzer is configured to cross-correlate a received signal sequence with a first chirp sequence to derive a correlation pattern indicating occurrences of the first chirp sequence within the received signal sequence and cross-correlate the correlation pattern with a first chirp sequence pattern unique to a first signal sequence comprising occurrences of the first chirp sequence as indicated by the first chirp sequence pattern to locate the first signal sequence within the received signal sequence.

Hence, transmission of the first signal sequence may not require synchronization between the sender and the signal analyzer, thereby reducing requirements regarding the accuracy of the clock of the sender.

Preferably, the first chirp sequence is a first constant amplitude zero autocorrelation, CAZAC, sequence.

Preferably, the signal analyzer is further configured to determine a measure of a frequency shift of the first signal sequence based on a phase difference between occurrences of the first CAZAC sequence within the received signal sequence.

Preferably, the signal analyzer is further configured to cross-correlate the received signal sequence with a second CAZAC sequence to derive a second correlation pattern indicating occurrences of the second CAZAC sequence within the received signal sequence, wherein the second CAZAC sequence is a complex conjugate of the first CAZAC sequence and cross-correlate the second correlation pattern with a second CAZAC sequence pattern unique to the first signal sequence comprising occurrences of the second CAZAC sequence as indicated by the second CAZAC sequence pattern.

Preferably, the signal analyzer is further configured to determine a measure of a frequency shift of the first signal sequence based on occurrences of the first CAZAC sequence and the second CAZAC sequence within the received signal sequence.

Preferably, the signal analyzer is further configured to cross-correlate the correlation pattern with another CAZAC sequence pattern unique to a second signal sequence comprising occurrences of the CAZAC sequence as indicated by the other CAZAC sequence pattern to locate the second signal sequence within the received signal sequence.

Thus, different signal sequences, e.g., signal sequences of different unsynchronized senders can be detected.

The system comprises a plurality of senders and the signal analyzer, wherein the senders are configured to transmit different identification signals comprising carrier waves modulated with unique patterns of CAZAC sequences.

For instance, as discussed above, patterns having a large number of CAZAC sequences (e.g., more than 10, 20, 30, 40, 50, 60, 70, 80, 90, or 100 occurrences) with varying distances and/or center frequencies between consecutive CAZAC sequences may achieve a very small cross-correlation with other CAZAC sequence patterns used by the respective sender or by other senders and thus uniquely identify the sender and/or data conveyed in the identification signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views, unless otherwise specified.

FIG. 7 shows a flow chart of a process carried out by the receiver-side of the systems shown in FIG. 1 to 6.

DETAILED DESCRIPTION

Figure 1:
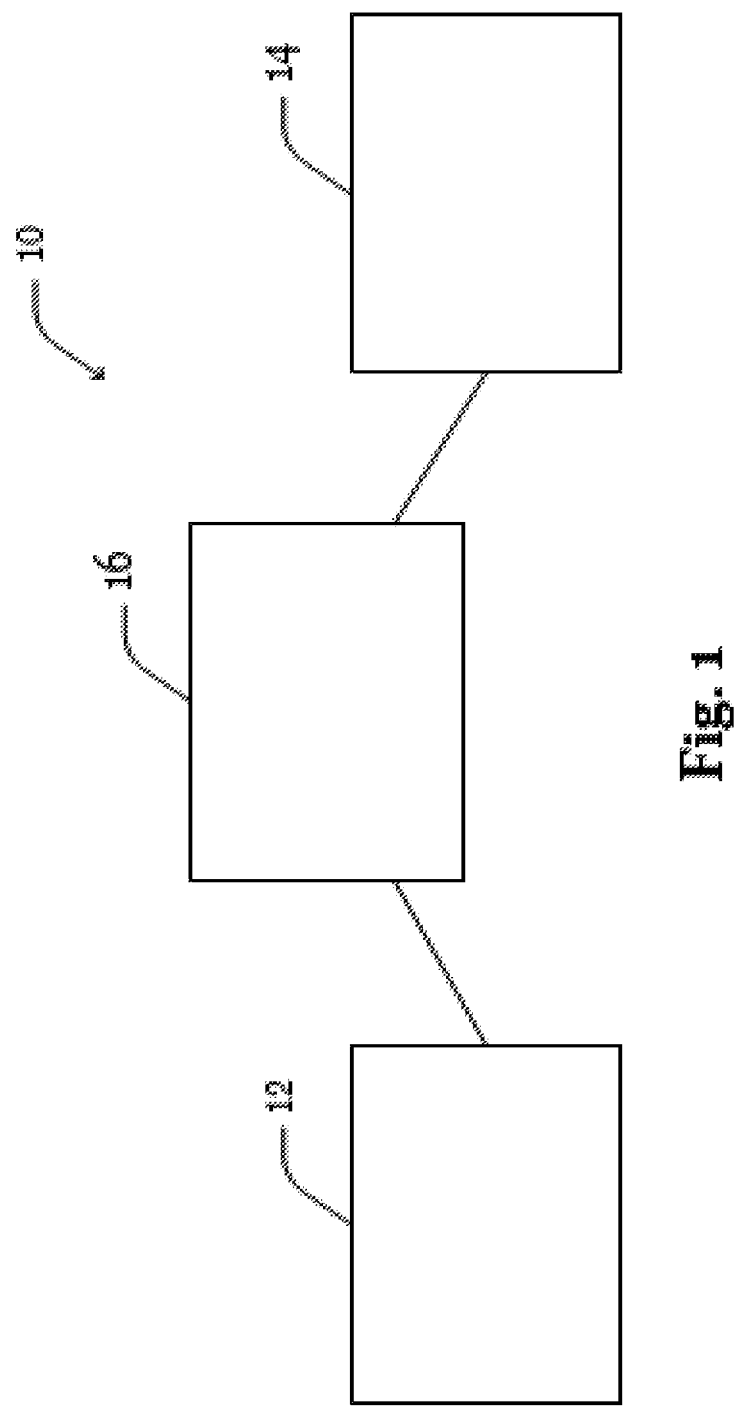
FIG. 1 shows a block diagram of an exemplary embodiment of the system.

FIG. 1 shows a system 10 comprising a sender 12 and a signal analyzer 14. During operation, the sender 12 transmits a signal sequence which is to be detected by the signal analyzer 14. For instance, the signal sequence may be transmitted via a radio signal relayed by a terrestrial, airborne or space-based unit 16 such as a base station, balloon, plane, satellite, etc. to allow for wide area coverage. Moreover, in order to enable the sender 12 to transmit the signal sequence at any time, the signal analyzer 14 may be configured to continuously analyze signal sequences recorded by a receiver within reach of the (relayed) signal transmission.

Figure 2:
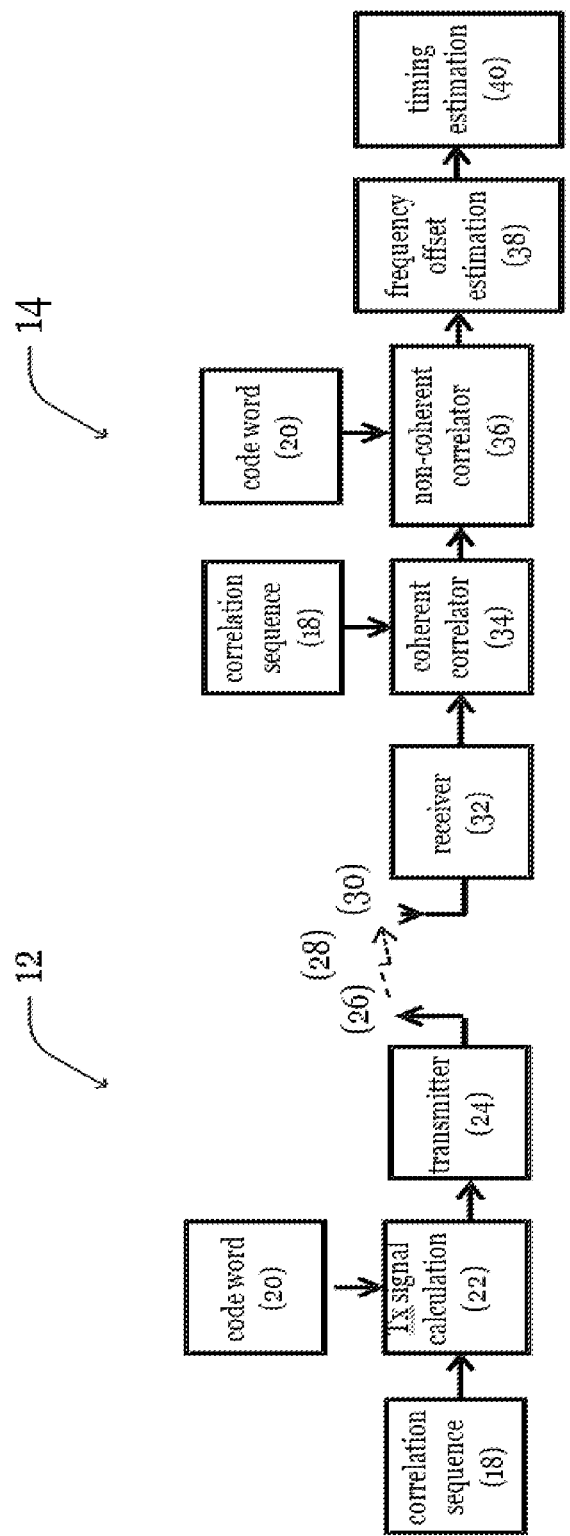
FIG. 2 shows a more detailed view of the system of FIG. 1.
Figure 3:
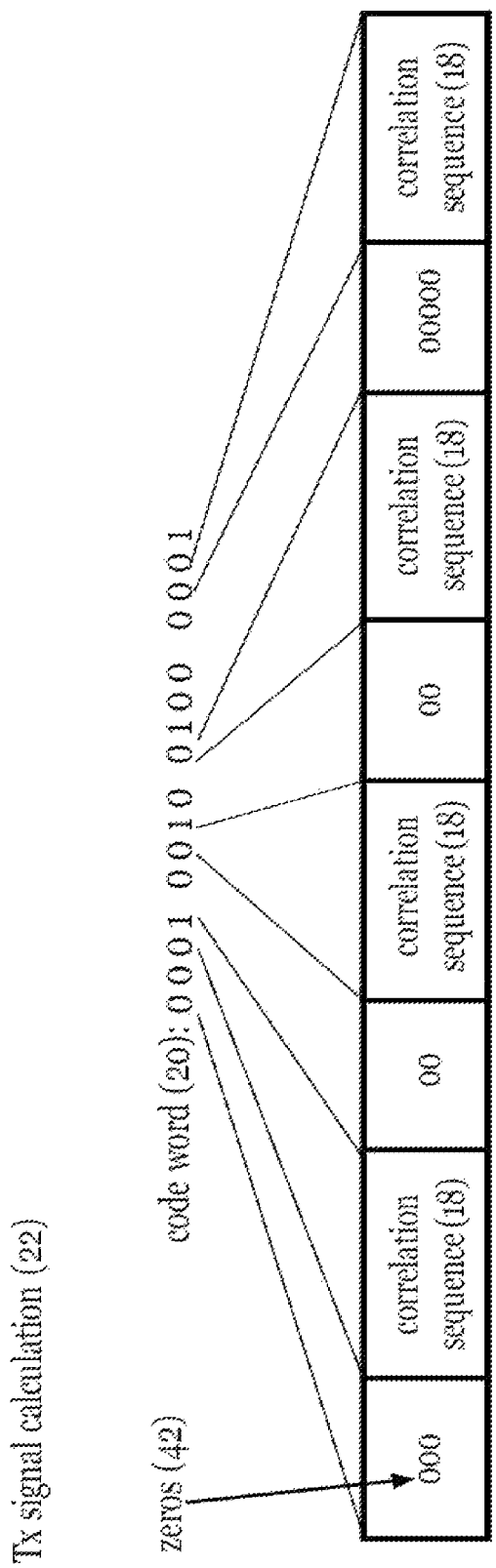
FIG. 3 schematically illustrates transmit signal calculation in the system of FIG. 2.

As shown in FIG. 2, the transmitted signal sequence may be calculated from a correlation sequence 18 (e.g., a chirp sequence such as a constant amplitude zero auto-correlation, CAZAC, sequence) and a code word 20 defining a unique correlation sequence pattern to allow for high correlation gain at the signal analyzer 14. For instance, as shown in FIG. 3, the code word 20 may define varying distances between occurrences of the correlation sequence 18 in the signal sequence. The signal sequence may thus define modulated and unmodulated carrier wave sequences making up the transmitted signal. For example, the ones of the transmit signal may correspond to the modulated carrier wave sequences and the zeros 42 may correspond to the unmodulated carrier wave sequences.

For instance, the modulated carrier wave sequences may be modulated with first CAZAC sequences $$p(n) = e^{j\pi \frac{Hn^2}{L}}$$

and/or second CAZAC sequences $$p^*(n) = e^{-j\pi \frac{Hn^2}{L}}$$

with n=0, 1, . . . , L−1 and L and H being two integer numbers that are relatively prime. Particularly, the ones of the code word 20 may be replaced with the first CAZAC sequences, the second CAZAC sequences, or alternatingly with first and second CAZAC sequences. In another example, the ones in the code word 20 may be replaced with alternating groups of first CAZAC sequences and second CAZAC sequences. Particularly, the ones in the code word 20 may be replaced by two first CAZAC sequences followed by two second CAZAC sequences, etc., thereby forming a signal sequence $s_\mu(n) = [p, Z(z_{\mu,1}), p, Z(z_{\mu,2}), p^*, Z(z_{\mu,3}), p^*, Z(z_{\mu,4}), \ldots]$ in which Z(x) indicates a series of x zeros 42. Alternatively, the code word 20 may define different frequency shifts of the correlation sequence 18, e.g., different center-frequencies of the CAZAC sequences.

Furthermore, the correlation sequences 18 within the correlation sequence pattern may be further manipulated in amplitude or phase to convey different data.

As shown in FIG. 2, the resulting radio signal may be sent by the transmitter 24 via the antenna 26 of the sender 12 over the air interface 28 and received by the antenna 30 of the receiver 32.

Figure 4:
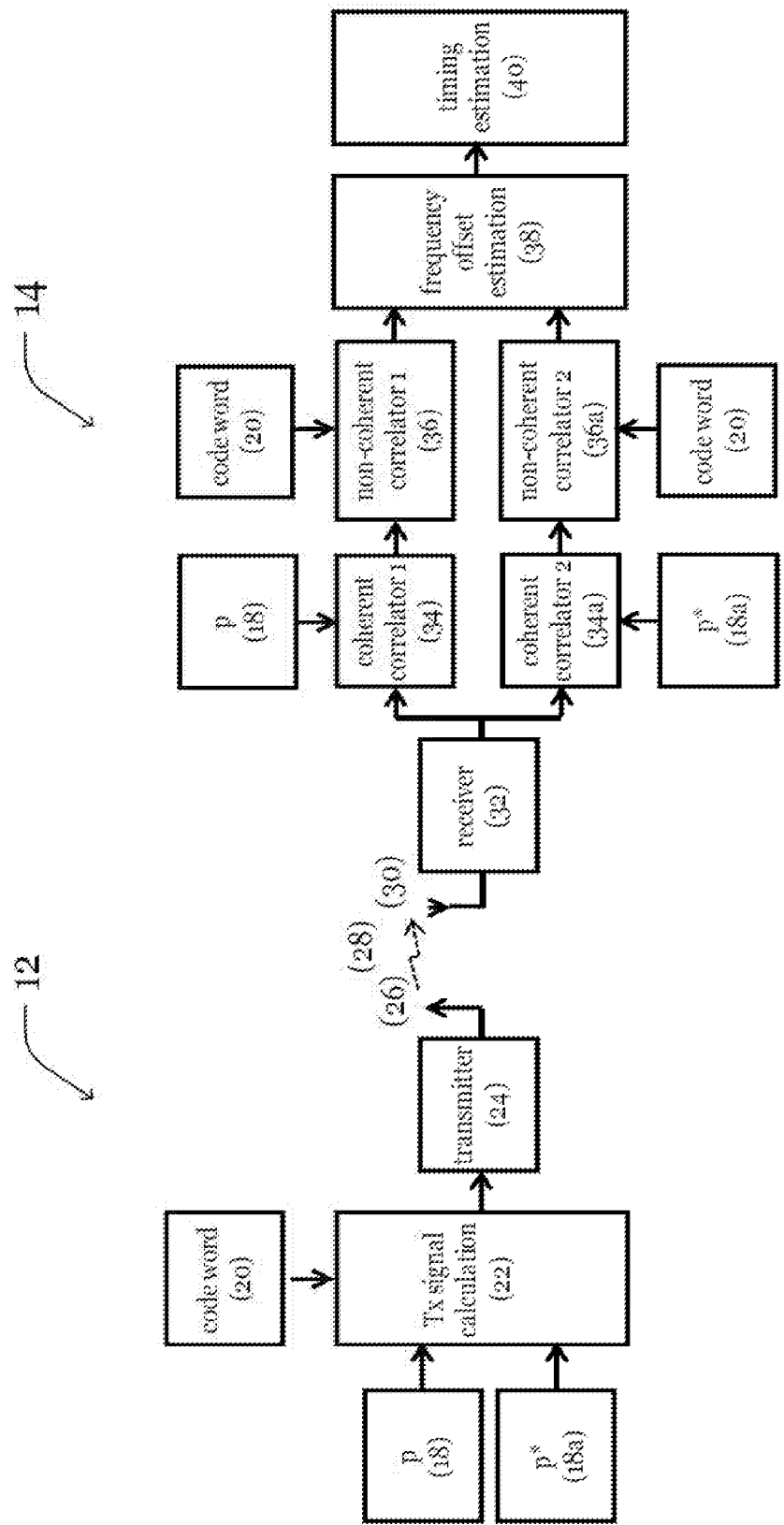
FIG. 4 shows a block diagram of another exemplary embodiment of the system.

To detect the signal sequence $s_\mu(n)$ within a received signal sequence r(n) derived by demodulation of the received radio signal, the signal analyzer 14 may use a coherent correlator 34 which is provided with the correlation sequence 18 to detect occurrences of the correlation sequence 18 in the received signal sequence r(n). For example, in the case of the signal sequence $s_\mu(n)$ which contains first and second CAZAC sequences, the signal analyzer 14 may be configured to cross-correlate the received signal sequence r(n) with the first CAZAC sequence p(n) and the second CAZAC sequence p*(n), respectively, as shown in FIG. 4. The determined cross-correlation results 11 $R_{r,p}(k) = \sum_{n=-\infty}^{\infty} r^*(n) \cdot p(n+k)$ and $R_{r,p^*}(k) = \sum_{n=-\infty}^{\infty} r^*(n) \cdot p^*(n+k)$ show peaks indicating (possible) occurrences of the first CAZAC sequence and the second CAZAC sequence within the received signal sequence r(n), as a function of the sample shift k.

To detect the signal sequence $s_\mu(n)$ within the correlation patterns $R_{r,p}(k)$ and $R_{r,p^*}(k)$, respectively, the signal analyzer 14 may comprise a non-coherent correlator 36 fed with the code word 20. Based on the code word 20, the signal analyzer 14 may determine a correlation sequence pattern to be used by the non-coherent correlator 36. For example, in the case of the signal sequence $s_\mu(n)$ which contains first and second CAZAC sequences, the signal analyzer 14 may be configured to determine the expected first CAZAC and second CAZAC sequence patterns:

$$q_{\mu,p}(n) = \begin{cases} 1 & \text{if first } CAZAC \text{ sequence expected} \\ 0 & \text{else} \end{cases}$$

$$q_{\mu,p^*}(n) = \begin{cases} 1 & \text{if second } CAZAC \text{ sequence expected} \\ 0 & \text{else} \end{cases}$$

The absolute value of the determined cross-correlation result may then be cross-correlated with the respective pattern:

$$R_{\mu,p}(k) = \sum_{n=-\infty}^{\infty} |R_{r,p}(n)| \cdot q_{\mu,p}(n+k)$$

$$R_{\mu,p^*}(k) = \sum_{n=-\infty}^{\infty} |R_{r,p^*}(n)| \cdot q_{\mu,p^*}(n+k)$$

The position of the signal sequence $s_\mu(n)$ within the received signal sequence r(n) may then be detected by determining the k for which the cross-correlation result $R_{\mu,p}(k)$ and $R_{\mu,p^*}(k)$, respectively, has a peak, wherein the determined k indicates the offset between the received signal sequence r(n) and the to-be-detected signal sequence $s_\mu(n)$. Once the signal sequence $s_\mu(n)$ is detected, the occurrences of the first and/or second CAZAC sequences may be used to estimate the frequency offset.

For example, a determined distance (in samples) between the peaks of $R_{\mu,p}(k)$ and $R_{\mu,p^*}(k)$ may be compared with an expected distance (in samples) to coarsely determine the frequency offset, as the frequency offset shifts the occurrences of the first and second CAZAC sequences (cf. S. Boumard, A. Mammela: "*Robust and accurate frequency and timing synchronization using chirp signals*", IEEE Transactions on Broadcasting, 2009, Vol. 55, Issue 1, pp. 115-123). Moreover, a phase shift between CAZAC sequences within the received signal sequence r(n) may be used to precisely estimate the frequency offset:

$$\Delta f_l = \frac{1}{2\pi(n_{l+1} - n_l)} \arg(R_{r,p}(n_l) \cdot R_{r,p}(n_{l+1})^*)$$

if the first CAZAC sequence is expected at $n_l$ $$\Delta f_l = \frac{1}{2\pi(n_{l+1} - n_l)} \arg(R_{r,p^*}(n_l) \cdot R_{r,p^*}(n_{l+1})^*) \text{ if the}$$

second CAZAC sequence is expected at $n_l$ with $n_l$ indicating the expected peaks. Furthermore, the result may be refined by calculating the mean over multiple determined frequency offsets $\Delta f_l$. In addition, timing estimation may be performed using $R_{\mu,p}(k)$ and $R_{\mu,p^*}(k)$ as input (cf. A. Gesell, J. Huber, B. Lankl, G. Sebald: "*Data-aided Timing Recovery for PAM Burst-mode Transmission*", Proceedings IEEE ICT 2001, Vol. 2, Bucharest, June 2001, pp. 431-436).

Figure 5:
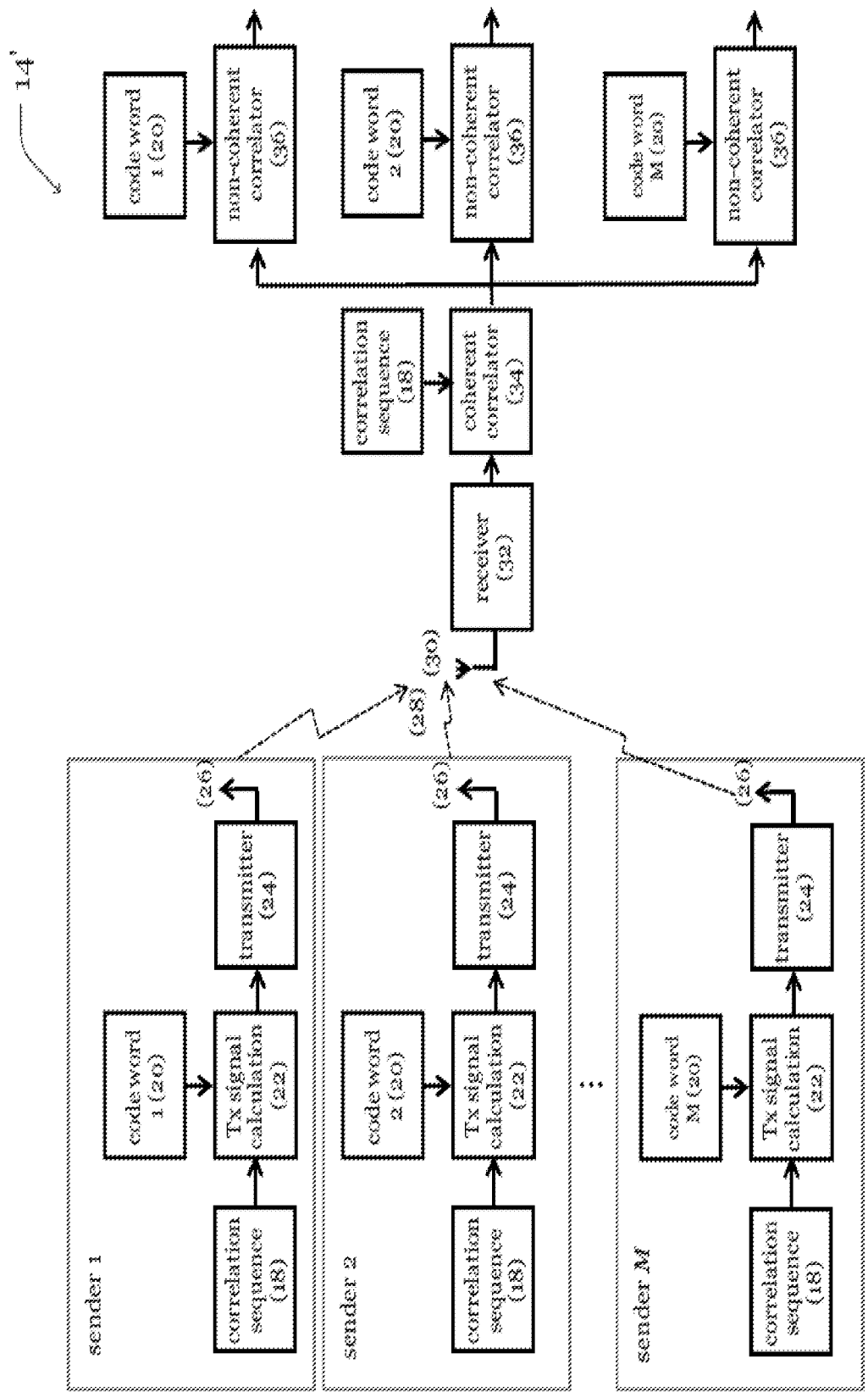
FIG. 5 shows a block diagram of another exemplary embodiment of the system.

As shown in FIG. 5, the above process for detecting a unique correlation sequence pattern within a received signal sequence r(n) may also be used to detect different correlation sequence patterns in the received signal sequence r(n). For instance, the received signal sequence r(n) may comprise a superposition of different unique signal sequences $s_\mu(n)$ with $\mu=0, 1, \ldots, M$, wherein the timing of the signal sequences $s_\mu(n)$ is a-priori unknown to the signal analyzer 14'. For example, the different unique signal sequences $s_\mu(n)$ may be transmitted by different senders 12 and hence allow assigning a detected unique signal sequence sp(n) to a particular sender 12 from a group of senders 12. For instance, the number M of senders 12 may be 4 and the code words 20 may be given by:

| sender | code word |
|---|---|
| 1 | 10000 01000 00010 01000 10000 |
| 2 | 10000 00100 01000 00100 10000 |
| 3 | 10000 00010 00001 00010 10000 |
| 4 | 10000 00001 00100 00010 10000 |

As indicated in FIG. 5 and discussed above, the received signal sequence r(n) may be cross-correlated with the correlation sequence 18. For example, in the case of the signal sequence $s_\mu(n)$ which contains the first and second CAZAC sequences, the signal analyzer 14' may be configured to cross-correlate the received signal sequence r(n) with the first CAZAC sequence p(n) and the second CAZAC sequence p*(n), respectively, analogously to the process shown in FIG. 4. To detect the signal sequences $s_\mu(n)$ within the correlation patterns $R_{r,p}(k)$ and $R_{r,p^*}(k)$, respectively, the signal analyzer 14' may comprise non-coherent correlators 36 fed with the code words 20. Based on the code words 20, the signal analyzer 14' may determine correlation sequence patterns to be used by the non-coherent correlators 36. For example, in the case of the signal sequence $s_\mu(n)$ which contains the first and second CAZAC sequences, the signal analyzer 14' may be configured to determine the expected first and second CAZAC sequence patterns $q_{\mu,p}(n)$ and $q_{\mu,p^*}(n)$.

The absolute value of the determined cross-correlation result may then be cross-correlated with the respective patterns, e.g., $R_{\mu,p}(k)$ and $R_{\mu,p^*}(k)$, for each sender 12. In this regard, it is to be noted that while the first cross-correlation is independent of the number of senders 12, the pattern matching, e.g., calculating $R_{\mu,p}(k)$ and $R_{\mu,p^*}(k)$, may be performed individually for each code word 20, as shown in FIG. 5. However, it is to note that since the expected first and second CAZAC sequence patterns $q_{\mu,p}(n)$ and $q_{\mu,p^*}(n)$ largely consist of zeros 42, processing load can be kept reasonable even in case of a large number of senders 12 (e.g., more than 10, 100, or 1000 senders).

In this regard, it is further noted that the number of ones in the code words 20 may be selected to be as small as possible. Thereby, transmit energy may be reduced, for example, to increase operation intervals of the sender 12, if the sender 12 comprises an energy storage device such as an accumulator. Moreover, processing load at the signal analyzer 14' may be reduced. Particularly, the code words 20 may be generated using the method suggested by S. Maric, Z. Kostic, E. Titlebaum: "A new family of optical code sequences for use in spread-spectrum fiber-optic local area networks", IEEE Transactions on Communications, 41(8), 1993. Furthermore, as indicated above, the correlation sequences within the correlation sequence patterns may be further manipulated in amplitude or phase to transmit data, such that the received data can be assigned to one of the senders 12.

Figure 6:
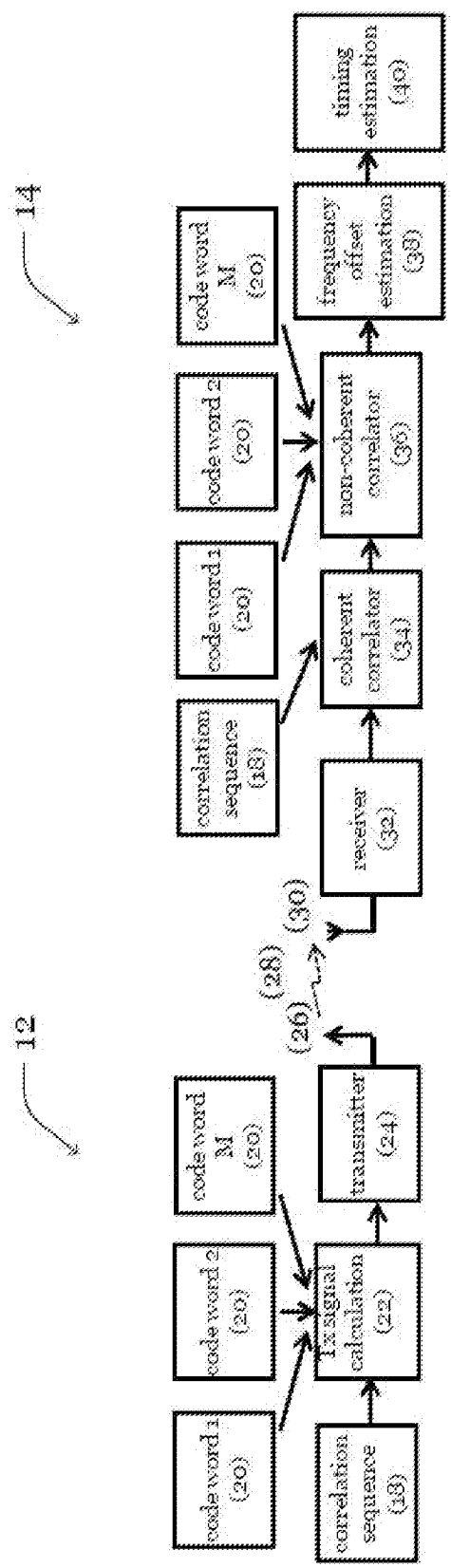
FIG. 6 shows a block diagram of yet another exemplary embodiment of the system.

In addition, as shown in FIG. 6, a single sender 12 may also employ different code words 20 to transmit different correlation sequence patterns. Thus, each sender 12 may be assigned a set of unique code words 20 which allow to identify the sender 12, as well as transmitting data by the sender 12. Moreover, as indicated above, the correlation sequences within the correlation sequence patterns may be further manipulated in amplitude or phase to transmit data. Thus, while a multitude of possible combinations exist of how the detected correlation sequence patterns may be used, the steps common to the combinations are depicted in FIG. 7 illustrating a process which comprises a step 44 of detecting the occurrences of the correlation sequence pattern in the received signal and a step 46 of matching one or more patterns to the occurrences.

LIST OF REFERENCE SIGNS 10, 10' system
12 sender
14, 14' signal analyzer
16 relay unit
18 correlation sequence
20 code word
22 Tx signal calculation
24 transmitter
26 antenna
28 air interface
30 antenna
32 receiver
34 coherent correlator
36 non-coherent correlator
38 frequency offset estimation
40 timing estimation
42 zeros
44, 46 process steps

What is claimed is:

1. A method, comprising:
cross-correlating a received signal sequence with a first correlation sequence to derive a first correlation pattern indicating occurrences of the first correlation sequence within the received signal sequence;
cross-correlating the first correlation pattern with a first correlation sequence pattern to detect a first signal sequence comprising occurrences of the first correlation sequence as indicated by the first correlation sequence pattern within the received signal sequence, wherein the first correlation sequence is a constant amplitude zero autocorrelation (CAZAC) sequence;
cross-correlating the received signal sequence with a second correlation sequence to derive a second correlation pattern indicating occurrences of the second correlation sequence within the received signal sequence, wherein the second correlation sequence is a complex conjugate of the CAZAC sequence;
cross-correlating the second correlation pattern with a second correlation sequence pattern to detect occurrences of the second correlation sequence as indicated by the second correlation sequence pattern within the received signal sequence; and
determining a measure of a frequency shift of the first signal sequence based on occurrences of the first correlation sequence and the second correlation sequence within the received signal sequence.

2. The method of claim 1, further comprising:
determining a measure of a frequency shift of the first signal sequence based on a phase difference between occurrences of the first correlation sequence within the received signal sequence.

3. The method of claim 1, further comprising:
estimating a timing of a first sender from which the first signal sequence was received; and
extracting data from a second signal sequence based on the determined measure.

4. The method of claim 3, wherein the first correlation sequence and the second correlation sequence are chirp sequences.

5. The method of claim 1, wherein the received signal sequence is a first received signal sequence and the method further comprises:
cross-correlating a third received signal sequence with the first correlation sequence to derive a third correlation pattern indicating occurrences of the first correlation sequence within the third received signal sequence;
cross-correlating the third correlation pattern with the first correlation sequence pattern to detect the first signal sequence comprising occurrences of the first correlation sequence as indicated by the first correlation sequence pattern, within the third received signal sequence;
determining a first time of flight of the first signal sequence within the first received signal sequence and a second time of flight of the first signal sequence within the third received signal sequence; and
providing position data of a sender of the first signal sequence based on the first and second times of flight.

6. The method of claim 1, wherein said cross correlating said received signal sequence with a first correlation sequence is carried out using a coherent correlator, wherein the first correlation sequence is a chirp sequence, and
wherein said cross correlating the first correlation pattern with a first correlation sequence pattern is carried out using a non-coherent correlator.

7. The method of claim 6, wherein the first correlation sequence is a constant amplitude zero autocorrelation, CAZAC, sequence.

8. The method of claim 6, further comprising:
cross-correlating the received signal sequence with a second correlation sequence to derive a second correlation pattern indicating occurrences of the second correlation sequence within the received signal sequence, wherein the second correlation sequence is a complex conjugate of the CAZAC sequence;
cross-correlating the second correlation pattern with a second correlation sequence pattern to detect occurrences of the second correlation sequence as indicated by the second correlation sequence pattern, within the received signal sequence; and
determining a measure of a frequency shift of the first signal sequence based on occurrences of the first correlation sequence and the second correlation sequence within the received signal sequence.

9. A signal analyzer-the signal analyzer configured to:
cross-correlate a received signal sequence with a first chirp sequence to derive a correlation pattern indicating occurrences of the first chirp sequence within the received signal sequence;
cross-correlate the correlation pattern with a first chirp sequence pattern unique to a first signal sequence comprising occurrences of the first chirp sequence as indicated by the first chirp sequence pattern to locate the first signal sequence within the received signal sequence, wherein the first chirp sequence is a first constant amplitude zero autocorrelation (CAZAC) sequence;
determine a measure of a frequency shift of the first signal sequence based on a phase difference between occurrences of the first CAZAC sequence within the received signal sequence;
cross-correlate the received signal sequence with a second CAZAC sequence to derive a second correlation pattern indicating occurrences of the second CAZAC sequence within the received signal sequence, wherein the second CAZAC sequence is a complex conjugate of the first CAZAC sequence;
cross-correlate the second correlation pattern with a second CAZAC sequence pattern unique to the first signal sequence comprising occurrences of the second CAZAC sequence as indicated by the second CAZAC sequence pattern; and
determine a measure of a frequency shift of the first signal sequence based on occurrences of the first CAZAC sequence and the second CAZAC sequence within the received signal sequence.

10. The signal analyzer of claim 9, wherein the signal analyzer is further configured to:
cross-correlate the correlation pattern with a third CAZAC sequence pattern unique to a second signal sequence comprising occurrences of the CAZAC sequence as indicated by the third CAZAC sequence pattern to locate the second signal sequence within the received signal sequence.

11. The signal analyzer of claim 9, wherein said signal analyzer comprises a coherent correlator and a non-coherent correlator, wherein said signal analyzer is configured to cross correlate said received signal sequence with said first chirp sequence using the coherent correlator,
and to cross-correlate the correlation pattern with said first chirp sequence pattern using said non-coherent correlator.

12. A method, comprising:
cross-correlating a received signal sequence with a first correlation sequence to derive a first correlation pattern indicating occurrences of the first correlation sequence within the received signal sequence, wherein the received signal sequence is a first received signal sequence;
cross-correlating the first correlation pattern with a first correlation sequence pattern to detect a first signal sequence comprising occurrences of the first correlation sequence as indicated by the first correlation sequence pattern, within the received signal sequence;
cross-correlating a third received signal sequence with the first correlation sequence to derive a third correlation pattern indicating occurrences of the first correlation sequence within the third received signal sequence;
cross-correlating the third correlation pattern with the first correlation sequence pattern to detect the first signal sequence comprising occurrences of the first correlation sequence as indicated by the first correlation sequence pattern, within the third received signal sequence;
determining a first time of flight of the first signal sequence within the first received signal sequence and a second time of flight of the first signal sequence within the third received signal sequence; and
providing position data of a sender of the first signal sequence based on the first and second times of flight.

13. A method, comprising:
cross-correlating a received signal sequence with a first correlation sequence to derive a first correlation pattern indicating occurrences of the first correlation sequence within the received signal sequence;
cross-correlating the first correlation pattern with a first correlation sequence pattern to detect a first signal sequence comprising occurrences of the first correlation sequence as indicated by the first correlation sequence pattern, within the received signal sequence, wherein said cross correlating said received signal sequence with a first correlation sequence is carried out using a coherent correlator, wherein the first correlation sequence is a chirp sequence, and wherein said cross correlating the first correlation pattern with a first correlation sequence pattern is carried out using a non-coherent correlator;
cross-correlating the received signal sequence with a second correlation sequence to derive a second correlation pattern indicating occurrences of the second correlation sequence within the received signal sequence, wherein the second correlation sequence is a complex conjugate of the CAZAC sequence;
cross-correlating the second correlation pattern with a second correlation sequence pattern to detect occurrences of the second correlation sequence as indicated by the second correlation sequence pattern, within the received signal sequence; and
determining a measure of a frequency shift of the first signal sequence based on occurrences of the first correlation sequence and the second correlation sequence within the received signal sequence.

* * * * *